United States Patent
Vilermo et al.

(10) Patent No.: US 10,789,042 B2
(45) Date of Patent: *Sep. 29, 2020

(54) METHOD AND APPARATUS FOR AN INTERACTIVE USER INTERFACE

(71) Applicant: Nokia Technologies Oy, Espoo (FI)

(72) Inventors: Miikka Tapani Vilermo, Siuro (FI); Arto Juhani Lehtiniemi, Lempaala (FI); Koray Ozcan, Farnborough (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 74 days.

This patent is subject to a terminal disclaimer.

(21) Appl. No.: 15/876,388

(22) Filed: Jan. 22, 2018

(65) Prior Publication Data

US 2018/0143804 A1  May 24, 2018

Related U.S. Application Data

(63) Continuation of application No. 14/334,226, filed on Jul. 17, 2014, now Pat. No. 9,875,080.

(51) Int. Cl.
*G06F 3/048* (2013.01)
*G06F 3/16* (2006.01)
(Continued)

(52) U.S. Cl.
CPC .......... *G06F 3/167* (2013.01); *G06F 3/0484* (2013.01); *G06F 3/0488* (2013.01);
(Continued)

(58) Field of Classification Search
CPC ...................................................... G06F 3/048
See application file for complete search history.

(56) References Cited

U.S. PATENT DOCUMENTS

| 5,812,688 | A | 9/1998 | Gibson |
| 6,369,821 | B2 | 4/2002 | Merrill et al. |

(Continued)

FOREIGN PATENT DOCUMENTS

| EP | 1152323 A2 | 11/2001 |
| EP | 2 680 616 A1 | 1/2014 |

(Continued)

OTHER PUBLICATIONS

Extended European Search Report for Application EP 15 82 1730 dated Feb. 26, 2018, 11 pages.

(Continued)

*Primary Examiner* — Pei Yong Weng
(74) *Attorney, Agent, or Firm* — Alston & Bird LLP

(57) ABSTRACT

A method, apparatus and computer program product are provided to facilitate user interaction with, such as modification of, respective audio objects. An example method may include causing a multimedia file to be presented that includes at least two images. The images are configured to provide animation associated with respective audio objects and representative of a direction of the respective audio objects. The method may also include receiving user input in relation to an animation associated with an audio object or the direction of the audio object represented by an animation. The method may further include causing replay of the audio object for which the user input was received to be modified.

18 Claims, 13 Drawing Sheets

(51) Int. Cl.
| | |
|---|---|
| G06F 3/0484 | (2013.01) |
| G06F 3/0488 | (2013.01) |
| G06F 3/0481 | (2013.01) |
| H04R 1/40 | (2006.01) |
| H04R 3/00 | (2006.01) |
| G10L 21/0272 | (2013.01) |
| H04S 7/00 | (2006.01) |
| H04N 21/43 | (2011.01) |

(52) U.S. Cl.
CPC ...... *G06F 3/04817* (2013.01); *G10L 21/0272* (2013.01); *H04N 21/4307* (2013.01); *H04R 1/406* (2013.01); *H04R 3/005* (2013.01); *H04R 2430/01* (2013.01); *H04R 2499/11* (2013.01); *H04S 7/30* (2013.01); *H04S 2400/11* (2013.01); *H04S 2400/13* (2013.01)

(56) References Cited

U.S. PATENT DOCUMENTS

| | | | | |
|---|---|---|---|---|
| 8,073,160 | B1* | 12/2011 | Classen | G11B 27/34 381/119 |
| 8,085,269 | B1 | 12/2011 | Classen | |
| 2002/0178012 | A1 | 11/2002 | Wang et al. | |
| 2007/0025703 | A1 | 2/2007 | Horie | |
| 2011/0078571 | A1* | 3/2011 | Asbahr | A63F 13/426 715/716 |
| 2012/0128174 | A1 | 5/2012 | Tammi et al. | |
| 2013/0132845 | A1 | 5/2013 | Tammi et al. | |
| 2013/0151249 | A1 | 6/2013 | Nakadai et al. | |
| 2013/0182858 | A1 | 7/2013 | You et al. | |
| 2013/0342731 | A1 | 12/2013 | Lee et al. | |
| 2014/0085538 | A1 | 3/2014 | Kaine et al. | |
| 2014/0129937 | A1 | 5/2014 | Jarvinen et al. | |
| 2015/0271618 | A1* | 9/2015 | Kim | H04S 1/002 381/17 |
| 2016/0073198 | A1 | 3/2016 | Vilermo et al. | |
| 2016/0299738 | A1 | 10/2016 | Makinen et al. | |

FOREIGN PATENT DOCUMENTS

| | | |
|---|---|---|
| EP | 2 921 944 A1 | 9/2015 |
| WO | WO 2011/062920 A1 | 5/2011 |
| WO | WO 2013/144417 A1 | 10/2013 |
| WO | WO 2013/149079 A1 | 10/2013 |
| WO | WO 2014/147442 A1 | 9/2014 |

OTHER PUBLICATIONS

Office Action for European Application No. 15821730.7 dated Apr. 18, 2019, 7 pages.

How to Make Things in After Effects React to the Audio? Mamoworld [online] [retrieved Dec. 13, 2017]. Retrieved from the Internet: <URL: https://protect-us.mimecast.com/s/1NJ3BrTKWREqC2?domain=mamoworld.com>. 3 pages.

LG G2 Top 30 Tips and Tricks to Fully Use Hidden Features, Maximise Performance and Extend Battery Life [online] [retrieved Feb. 3, 2014]. Retrieved from the Internet: <URL: au.ibtimes.com/articles/515749/20131022/lg-g2-top-30-tips-tricks-fully.htm>. (dated Oct. 22, 2013) 3 pages.

MoWithLove | Windows Phone Apps+Games Store (United States) [online] [retrieved Sep. 11, 2014]. Retrieved from the Internet: <URL: https://web.archive.org/web/20131107045746/http://www.windowsphone.com/en-us/store/app/mowithlove/be91f7a8-87bf-46fd-baf6-842e40ab3654>. (dated Nov. 7, 2013). 2 pages.

WhyDSP:: Spatial Audio Signal Processing, KWU, lecture note (7)—Spatial Coding [online] [retrieved Sep. 10, 2014] <URL: http://speechenhancement.tistory.com/159>. (dated Jun. 14, 2011) 4 pages.

Makino, S. et al., *Blind Source Separation of Convolutive Mixtures of Speech in Frequency Domain*, IEICE Transaction on Fundamentals of Electronics, Communications and Computer Sciences, vol. E88-A (Jul. 2005).

Mukai, Ryo et al., *Robust Real-Time Blind Source Separation for Moving Speakers in a Room*, ICASSP 20 (2003) pp. V-469-V472.

Parra, L. et al., *On-Line Convoluted Blind Source Separation of Non-Stationary Signals*, Journal of VLSI Signal Processing Systems for Signal, Image and Video Technology, vol. 26, Issue 1-2 (Aug. 2000) pp. 39-46.

Pugh, G. "How to Make an Interactive eBook Without Any Code" [online] [retrieved Sep. 8, 2015] <URL: http://www.raywenderlich.com/19415/how-to-make-an-interactive-ebook-without-any-code>.

European Application No. 14160370.4, filed Mar. 17, 2014, entitled *User Interface*.

International Application No. PCT/IB2013/052690 filed Apr. 4, 2014 entitled *Audio Processing Apparatus*.

International Application No. PCT/IB2013/052212, filed Mar. 20, 2013; In re: Vilermo, entitled *Spatial Audio Apparatus*.

International Search Report and Written Opinion for International Application No. PCT/FI2015/050447, dated Oct. 1, 2015.

Notice of Allowance for U.S. Appl. No. 14/334,226 dated Sep. 15, 2017.

Office Action for U.S. Appl. No. 14/334,226 dated Feb. 27, 2017.

Office Action for U.S. Appl. No. 14/334,226 dated Nov. 9, 2016.

Advisory Action for U.S. Appl. No. 14/334,226 dated Aug. 3, 2017.

*Spatial Coding—SBR/PS/MPEG Surround/SAOC*, Parametric Coding Standard, Spatial Audio Signal Processing, KWU, Lecture Notes, Slide No. 51 (2011) 4 pages.

Summons to Attend Oral Proceedings for European Application No. 15 821 730.7 dated Jun. 3, 2020, 9, pages.

\* cited by examiner

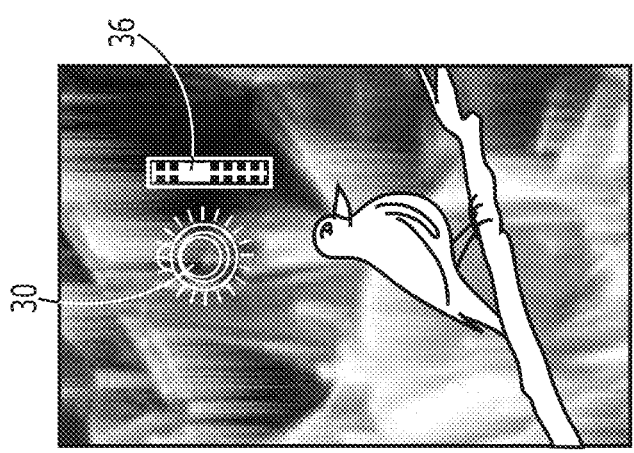
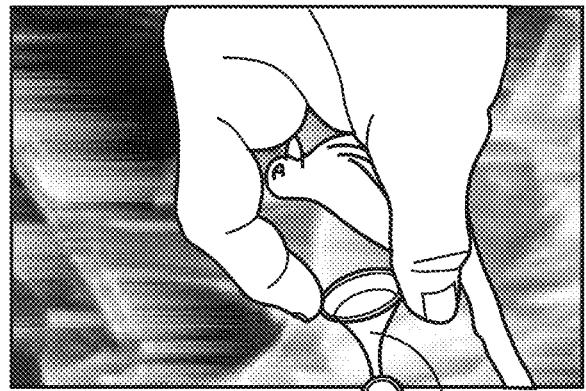
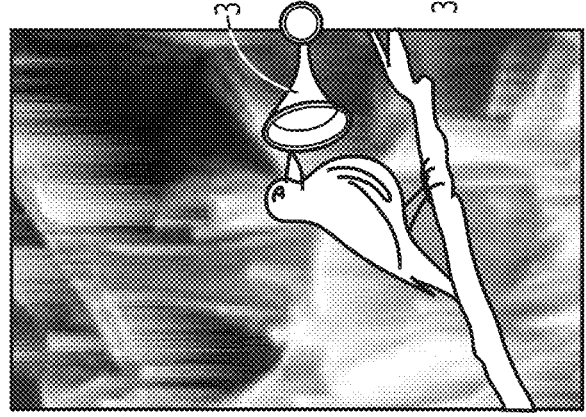
Figure 4A
Figure 4B
Figure 4C
Figure 4D

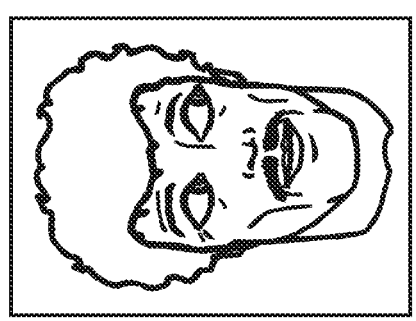
Figure 13A
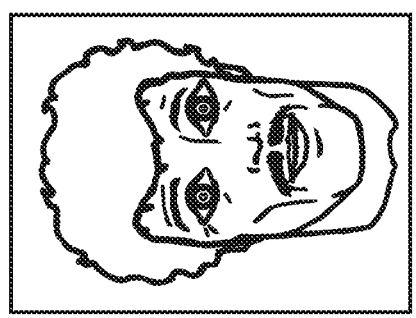
Figure 13B
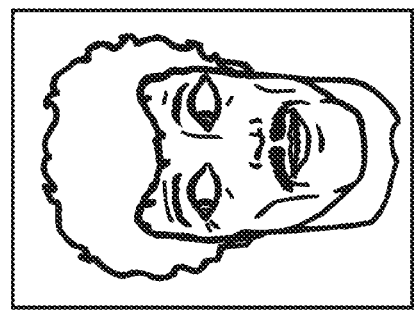
Figure 13C
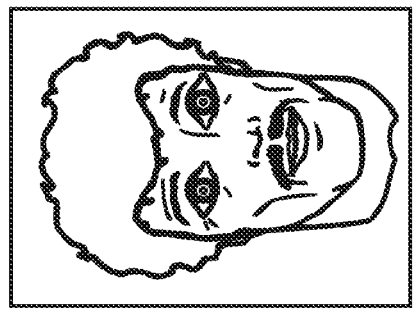
Figure 13D
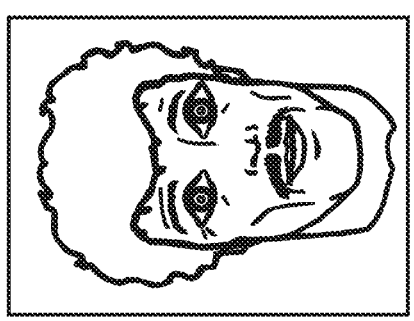
Figure 13E
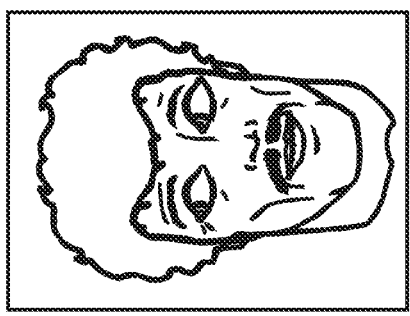
Figure 13F
Figure 13G

METHOD AND APPARATUS FOR AN INTERACTIVE USER INTERFACE

CROSS REFERENCE TO RELATED APPLICATION

This application is a continuation of U.S. application Ser. No. 14/334,226, filed Jul. 17, 2014, the entire contents of which are incorporated herein by reference.

TECHNOLOGICAL FIELD

An example embodiment of the present invention relates generally to the control of an audio object and, more particularly, to the use of animation to discriminate between audio objects and to facilitate control of the audio objects.

BACKGROUND

A multimedia file may include one or more images and one or more audio objects. The audio objects may originate with different sources, such as different people engaged in a conversation. As such, the audio objects may be distinguished from one another based upon various audio parameters including, for example, the direction from which an audio object originates.

The discrimination between audio objects has become more practical as audio recording devices have been implemented that include multiple microphones. For example, mobile terminals, such as smartphones, now frequently have multiple microphones. The increased number of microphones facilitates improved voice call quality including improved hands-free voice quality and provides for more advanced video recording audio options. In this regard, the capture of audio signals by an audio recording device, such as a mobile terminal, having multiple microphones permits the audio objects to be separated based upon their respective directions. As such, audio tracks may be constructed that include some, but not all, of the audio objects, thereby permitting undesired audio objects, such as the audio objects that principally include noise, to be removed.

Notwithstanding the increased capability of audio recording devices or audio processing devices to distinguish audio objects, it may be difficult for a user to determine the number of audio objects that have been identified and to further determine the characteristics of those audio objects, such as the direction from which an audio objects originates, as there is not an intuitive manner in which to provide this information regarding distinct audio objects to the user. User interfaces do exist that provide a mixing console or otherwise include one or more sliders to permit a user to modify respective audio objects. However, these user interfaces are not generally intuitive for most users and, instead, generally require an audio professional or a user of comparable experience to operate the mixing console properly or require the investment of substantial time to learn how to operate the mixing console to provide the desired output.

BRIEF SUMMARY

A method, apparatus and computer program product are provided in accordance with an example embodiment in order to facilitate user interaction with, such as modification of, respective audio objects. In this regard, the method, apparatus and computer program product of an example embodiment permit the various audio objects to be identified in an intuitive manner, such as through the use of an animation. The method, apparatus and computer program product of an example embodiment may then also permit the user to provide input in order to modify a respective audio object, also in an intuitive manner. As such, users may more readily interact with individual audio objects in accordance with a method, apparatus and computer program product of an example embodiment so as to create a desired audio track without having to interact with a more complex user interface, such as a mixing console.

In an example embodiment, a method is provided that includes causing a multimedia file to be presented that includes at least two images and audio comprising a plurality of audio objects. The at least two images are configured to provide animation associated with respective audio objects and representative of a direction of the respective audio objects. The method of this example embodiment also includes receiving user input in relation to an animation associated with an audio object or the direction of the audio object represented by an animation. The method of this example embodiment also includes causing replay of the audio object for which the user input was received to be modified.

The method of an example embodiment may receive user input that is indicative of a first direction. In this example embodiment, the method may cause replay of the audio object by controlling the replay of the audio objects such that the audio object having a direction that extends in the first direction is emphasized relative to audio objects having other directions. Alternatively, the method of this example embodiment may cause replay of the audio object by controlling the replay of the audio objects such that the audio object having a direction that extends in the first direction is deemphasized relative to audio objects having a direction different than the first direction. Still further, the method of this example embodiment may alternatively also include receiving user input modifying the volume of the audio object having a direction that extends in the first direction.

The at least two images may include a plurality of individually selectable animations associated with different respective audio objects. In an example embodiment, the method may also include dividing a video into a plurality of sections. Each section may include a plurality of images including one or more animations associated with respective audio objects and representative of a direction of the respective audio objects.

In another example embodiment, an apparatus is provided that includes at least one processor and at least one memory including computer program code with the at least one memory and the computer program code configured to, with the processor, cause the apparatus to at least cause a multimedia object to be presented that includes at least two images and audio comprising a plurality of audio objects. The at least two images are configured to provide animation associated with respective audio objects and representative of a direction of the respective audio objects. The at least one memory and the computer program code are also configured to, with the processor, cause the apparatus of this example embodiment to receive user input in relation to an animation associated with an audio object or the direction of the audio object represented by the animation. The at least one memory and the computer program code are also configured to, with the processor, cause the apparatus of an example embodiment to cause replay of the audio object from which user input was received to be modified.

The at least one memory and the computer program code may be configured to, with the processor, cause the apparatus to receive user input indicative of a first direction. In this regard, the at least one memory and the computer program code may be configured to, with the processor, cause the apparatus of an example embodiment to control the replay of the audio objects such that the audio object having a direction that extends in the first direction is emphasized relative to audio objects having other directions being muted. The at least one memory and the computer program code may alternatively be configured to, with the processor, cause the apparatus of another embodiment to cause replay of the audio object by controlling the replay of the audio objects such that the audio object having a direction that extends in the first direction is deemphasized relative to audio objects having a direction different than the first direction. The at least one memory and the computer program code may be further configured to, with the processor, cause the apparatus of yet another alternative embodiment to receive user input modifying the volume of the audio object having a direction that extends in the first direction.

The at least two images may include a plurality of individually selectable animations associated with different respective audio objects. The at least one memory and the computer program code may be further configured to, with the processor, cause the apparatus of an example embodiment to divide a video into a plurality of sections. Each section may include a plurality of images including one or more animations associated with respective audio objects representative of a direction of the respective audio objects.

In a further example embodiment, a computer program product is provided that includes at least one non-transitory computer-readable storage medium having computer-executable program code instructions stored therein with the computer-executable program code instructions including program code instructions to, when executed by at least one processor, cause the multimedia file to be presented that includes at least two images. The at least two images are configured to provide animation associated with respective audio objects and representative of the direction of the respective audio objects. The computer-executable program code instructions may also include program code instructions to, when executed by the at least one processor, cause user input to be received in relation to an animation associated with an audio object or the direction of the audio object represented by an animation. The computer-executable program code instructions may also include program code instructions to, when executed by the at least one processor, cause replay of the audio object for which the user input was received to be modified.

In yet another example embodiment, an apparatus is provided that includes means, such as a processor, processing circuitry, user interface or the like, for causing a multimedia file to be presented that includes at least two images. The at least two images are configured to provide animation associated with respective audio objects and representative of a direction of the respective audio objects. The apparatus of this example embodiment also includes means, such as a processor, processing circuitry, user interface or the like, for receiving user input in relation to an animation associated with an audio object or the direction of the audio object represented by an animation. The apparatus of this example embodiment also includes means, such as a processor, processing circuitry, user interface or the like, for causing replay of the audio object for which the user input was received to be modified.

In an example embodiment, a method is provided that includes causing at least two images to be presented, receiving audio signals and determining a direction of an audio object from the audio signals. The method of this example embodiment also includes providing for visual animation representative of the direction of the audio object. The visual animation may be provided by, for example, causing one or more subsequent images to be presented that represent movement in the direction of the audio object relative to the at least two images that were previously presented or causing an artificial element to be added to at least one initial image with the artificial element indicating the direction of the audio object relative to the one or more initial images.

The method of an example embodiment may also include determining a beat associated with the audio object. In this example embodiment, the method may provide for visual animation representative of the direction of the audio object in synchronization with the beat. The method of an example embodiment may also include causing a plurality of images to be presented and determining one or more of the plurality of images to be replaced with a respective subsequent image based upon a parameter associated with the audio object. In one embodiment in which the determination of one or more of the plurality of images to be replaced with a respective subsequent image includes a determination that less than all of the initial images are to be replaced with a respective subsequent image, one or more of the images that were previously presented remain following the visual animation. In this embodiment, the method may provide for the visual animation by causing one or more subsequent images to be presented in a manner that is based on the direction of the audio object and that represents movement in the direction of the audio object relative to the one or more of the plurality of images that have been determined to be replaced.

In another example embodiment, an apparatus is provided that includes at least one processor and at least one memory including the computer program code with the at least one memory and the computer program code configured to, with the processor, cause the apparatus to cause at least two images to be presented, to receive audio signals and to determine a direction of an audio object from the audio signals. The at least one memory and the computer program code may also be configured to, with the processor, cause the apparatus of this example embodiment to provide for visual animation representative of the direction of the audio object.

In a further example embodiment, a computer program product is provided that includes at least one non-transitory computer-readable storage medium having computer-executable program code instructions stored therein with the computer-executable program code instructions including program code instructions to, when executed by at least one processor, cause at least two images to be presented. The computer-executable program code instructions of this example embodiment also include program code instructions to receive audio signals and program code instructions to determine a direction of an audio object from the audio signals. The computer-executable program code instructions of this example embodiment may also include program code instructions to provide for visual animation representative of the direction of the audio object.

In yet another example embodiment, an apparatus is provided that includes means, such as a processor, processing circuitry, user interface or the like, for causing at least two images to be presented, means, such as a processor, processing circuitry, communication interface or the like, for receiving audio signals and means, such as a processor, processing circuitry or the like, for determining a direction of an audio object from the audio signals. The apparatus of this example embodiment also includes means for providing for visual animation representative of the direction of the audio object.

BRIEF DESCRIPTION OF THE DRAWINGS

Figure 1:
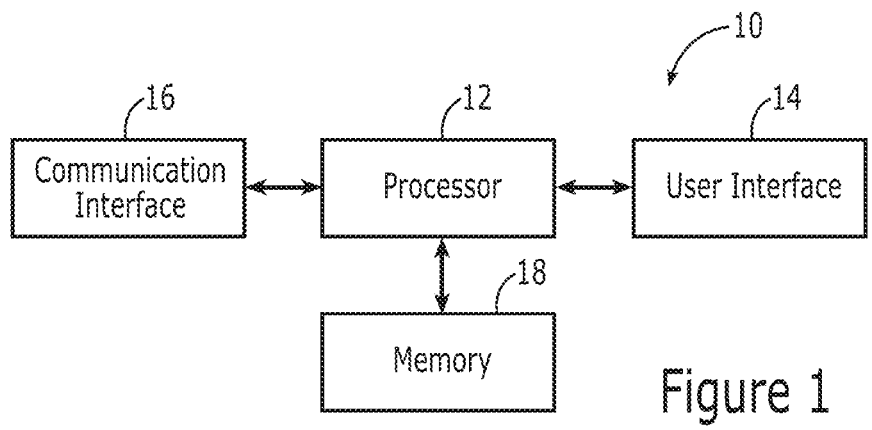
Figure 2:
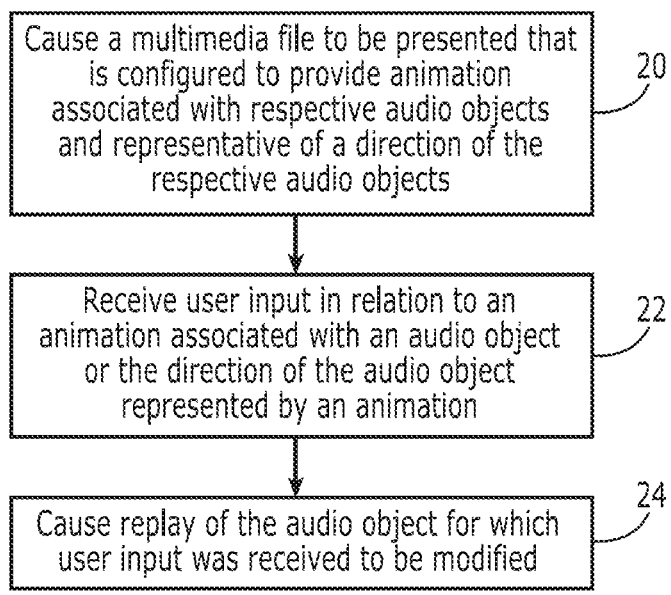
Figure 3C:
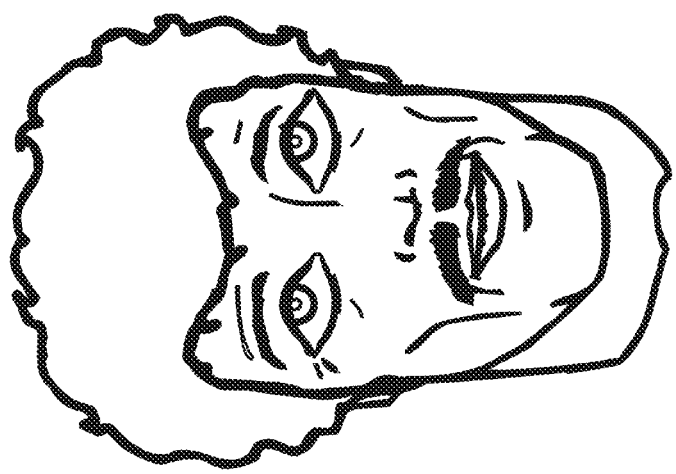
Figure 3B:
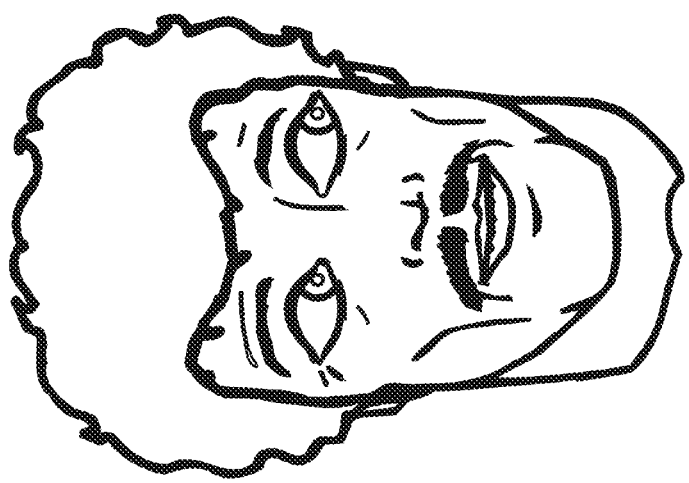
Figure 3A:
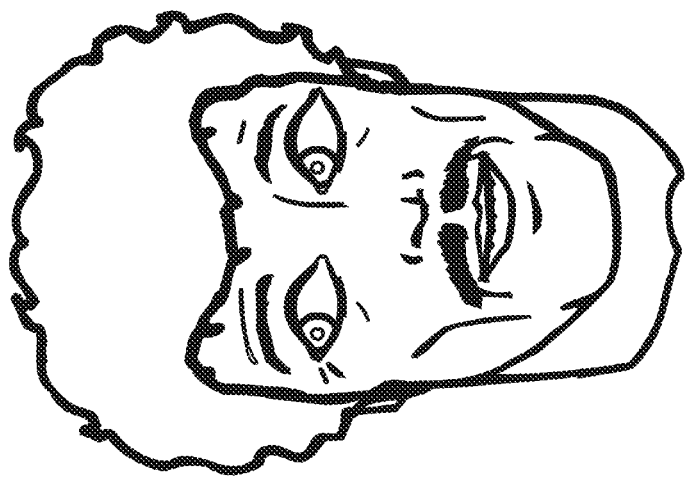
Figure 6:
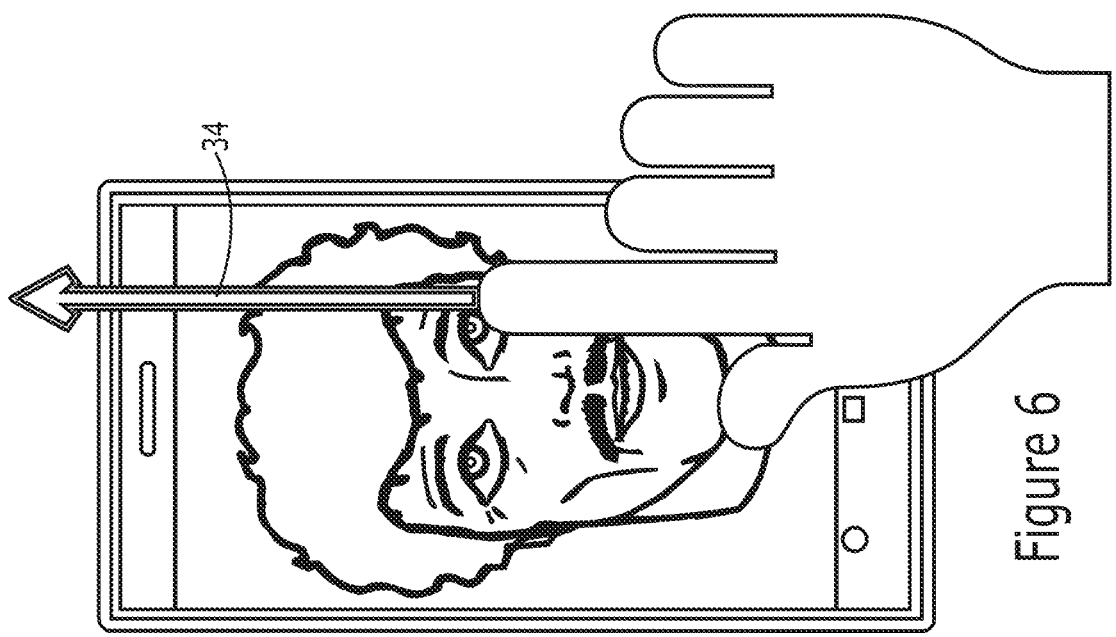
Figure 5:
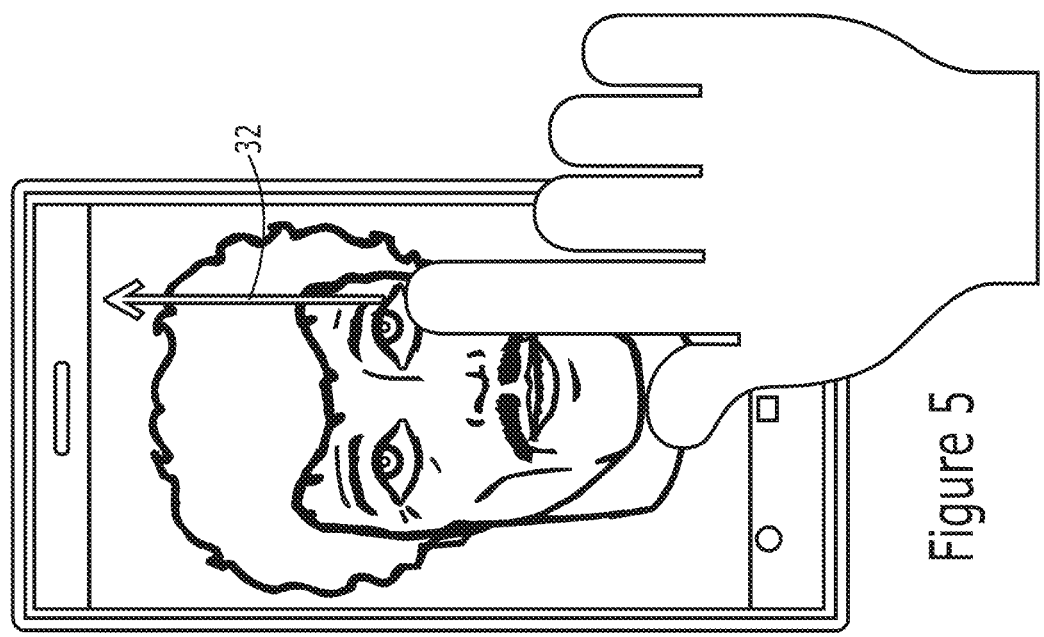
Figure 7:
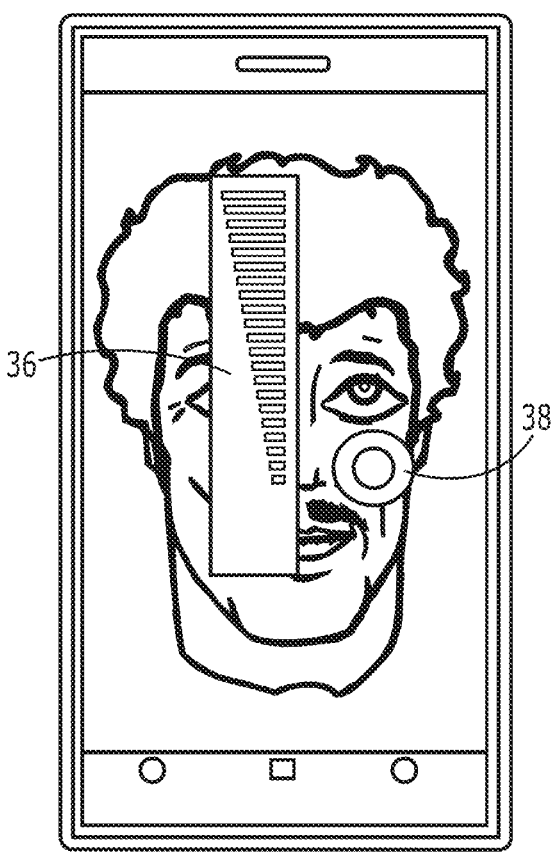
Figure 8A:
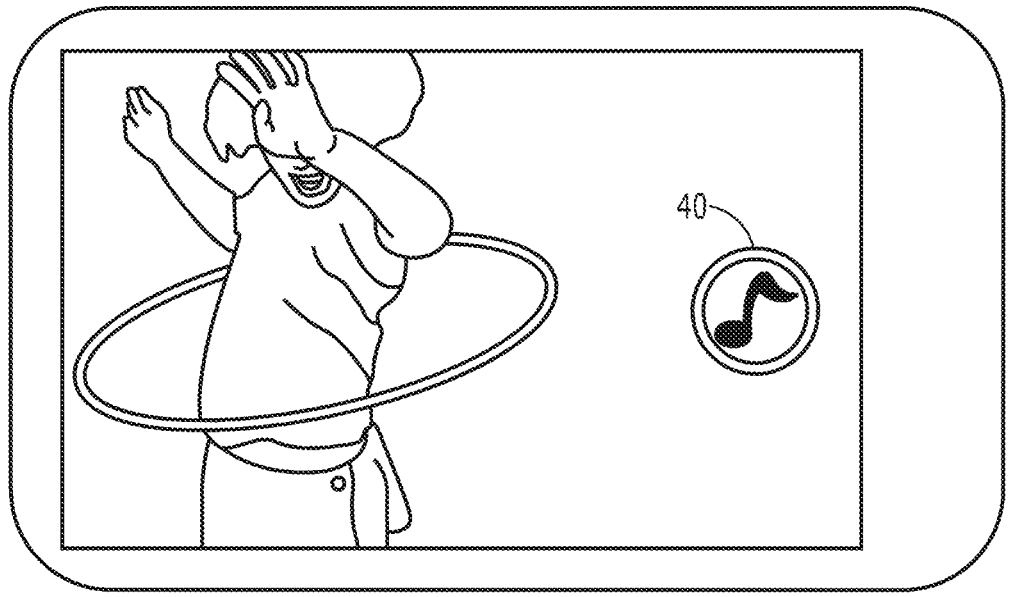
Figure 8B:
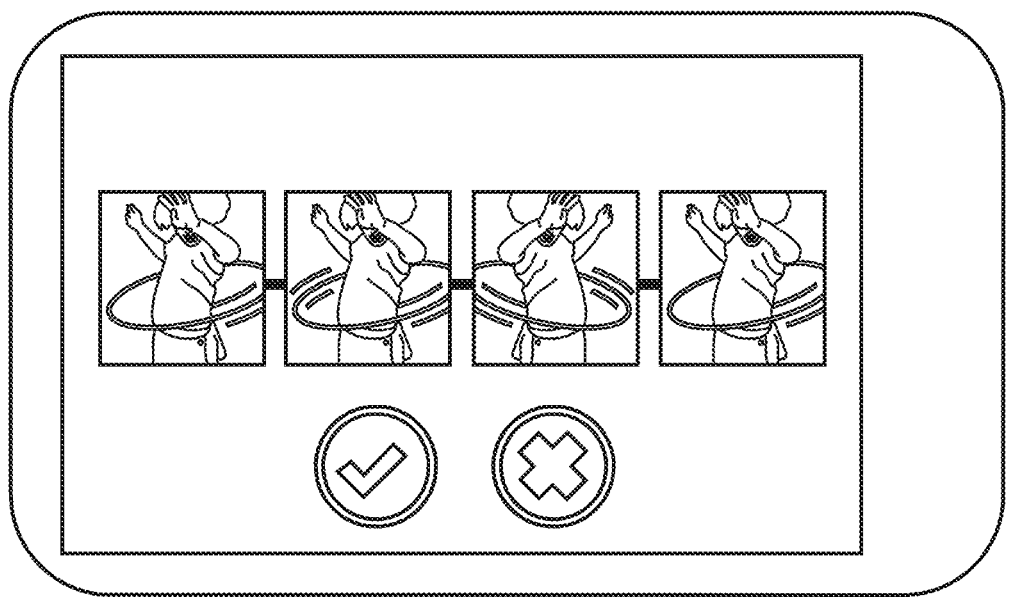
Figure 9:
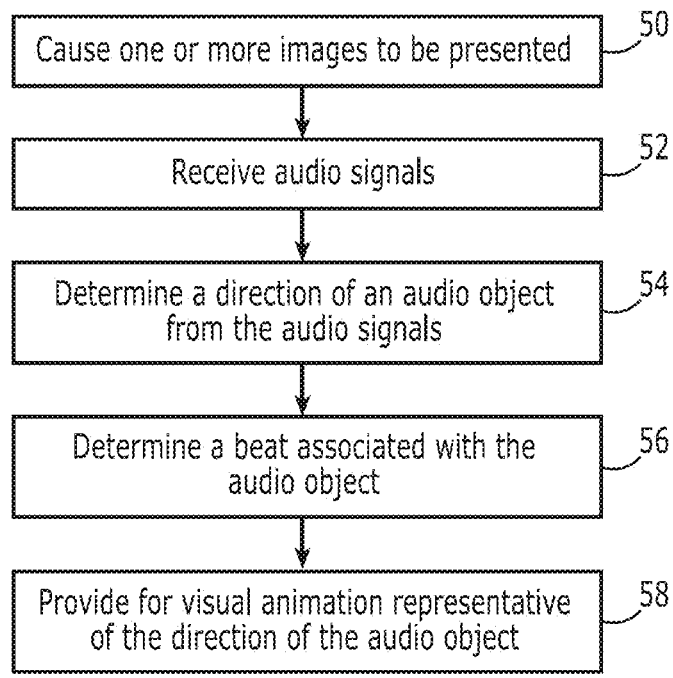
Figures 10A, 10B:
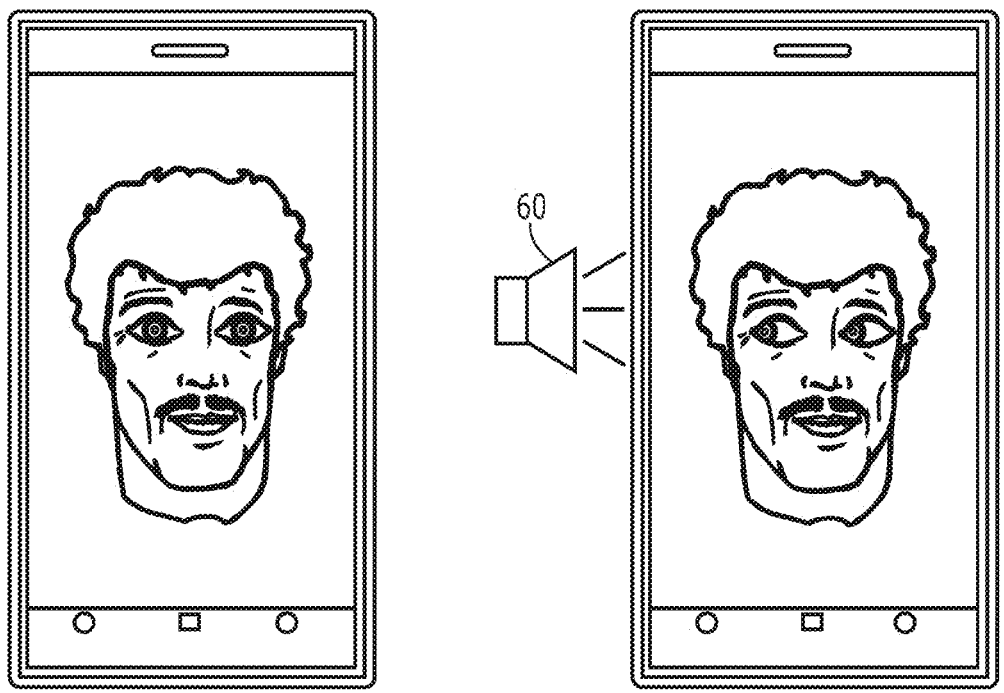
Figure 11A:
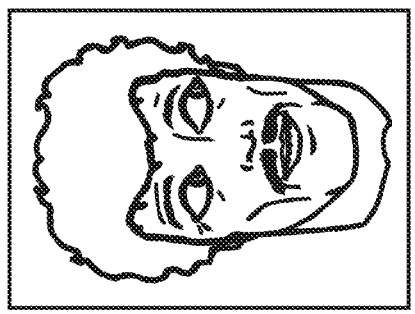
Figure 11B:
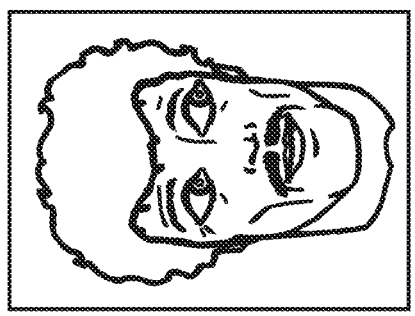
Figure 11C:
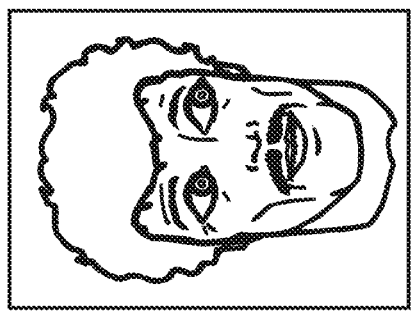
Figure 11D:
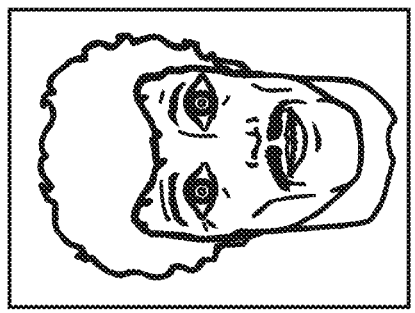
Figure 11E:
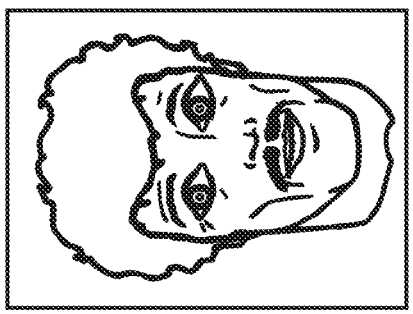
Figure 11F:
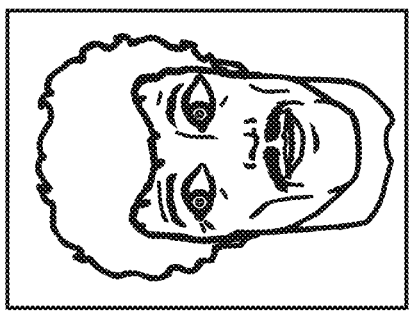
Figure 11G:
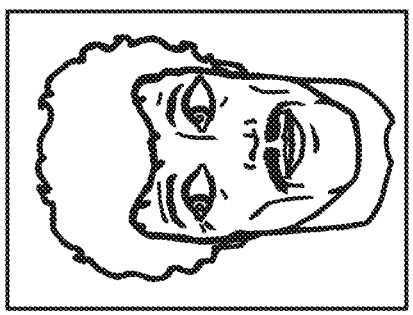
Figure 11H:
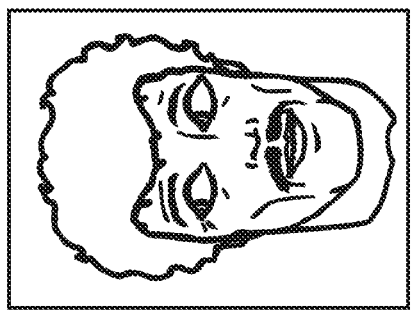
Figure 12A:
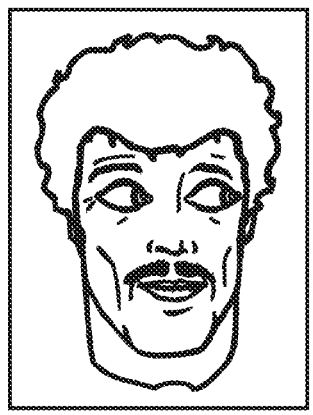
Figure 12B:
Figure 12C:
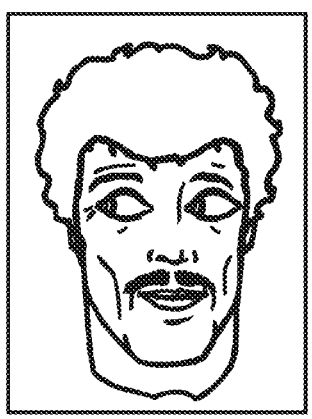

Having thus described certain embodiments in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating operations performed, such as by the apparatus of FIG. 1, in accordance with an example embodiment of the present invention;

FIGS. 3A-3C are a sequence of images that include an animation indicating the respective directions of three different audio objects in accordance with an example embodiment of the present invention;

FIGS. 4A-4D are a sequence of images that include an artificial element indicative of the direction of different respective audio objects in accordance with an example embodiment of the present invention;

FIG. 5 is an image representative of user input in a first direction associated with a respective audio object in accordance with an example embodiment of the present invention;

FIG. 6 is an image representative of input in a first direction associated with a respective audio object that extends beyond the image in accordance with an example embodiment of the present invention;

FIG. 7 is an image of a user interface that facilitates modification of the volume of an audio object having a respective direction that corresponds to the direction of the user input in accordance with an example embodiment of the present invention;

FIGS. 8A and 8B illustrate the manner in which a video may be divided into sections with each section including a plurality of images including one or more animations associated with respective audio objects in accordance with an example embodiment of the present invention;

FIG. 9 is a flowchart illustrating operations performed, such as by the apparatus of FIG. 1, in accordance with an example embodiment of the present invention;

FIGS. 10A and 10B illustrate a visual animation representative of a direction of an audio object in accordance with an example embodiment of the present invention;

FIGS. 11A-11H are a sequence of images representing a visual animation having a relatively smooth transition to the direction of an audio object in accordance with an example embodiment of the present invention;

FIGS. 12A-12C are images representing a visual animation that transitions to the direction of an audio object in synchronization with a beat of the audio object in accordance with an example embodiment of the present invention;

FIGS. 13A-13G are a sequence of images of a visual animation representative of the direction of an audio object in synchronization with the beat of the audio object in accordance with an example embodiment of the present invention; and FIGS. 14A-14E are a series of image gallery views that provide a visual animation representative of the direction of the audio object synchronized with a plurality of sequential beats of the audio object in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus and computer program product are provided in accordance with an example embodiment in order to cause one or more images to be animated in a manner that facilitates the identification of individual audio objects and the modification of those audio objects by a user. By permitting a user to discriminate between audio objects and to modify the individual audio objects in an intuitive manner, audio tracks may be constructed that include only the audio objects that are desired with audio objects that are undesired, such as audio objects that primarily represent noise, deemphasized or removed altogether. Consequently, a user make take advantage of the capability of audio recording devices that include multiple microphones to discriminate between audio objects in order to edit the individual audio objects in a more intuitive manner, thereby potentially improving the resulting audio track as well as the overall user experience.

The apparatus 10 of an example embodiment may be embodied by, associated with or otherwise in communication with a variety of different electronic devices including, for example, audio and/or video recording devices, audio and/or video playback devices and the like. These electronic devices that may be specifically configured in accordance with an example embodiment may include mobile terminals, such as a mobile telephone, a smartphone, a personal digital assistant (PDA), a portable computer, a tablet computer, a laptop computer, a music player, an electronic book or the like. Alternatively, the electronic devices that may be specifically configured in accordance with an example embodiment may include fixed computing terminals, such as a personal computer, a computer workstation, a server or the like. Regardless of the manner in which the apparatus is embodied, the apparatus that may be specifically configured in accordance with an example embodiment may include or otherwise be associated with a processor 12, a memory device 14, a user interface 16 and optionally a communication interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by any of various electronic devices including, for example, audio and/or video recording devices or audio and/or video playback devices or electronic devices with which audio and/or video recording devices or audio and/or video playback devices are in communication. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, audio and/or video recording devices or audio and/or video playback devices) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may also include or otherwise be in communication with a user interface 16. The user interface may include a touch screen display, a keyboard, a mouse, a joystick or other input/output mechanisms. In some embodiments, the user interface, such as a display, speakers, or the like, may also be configured to provide output to the user. In an example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14, and/or the like).

The apparatus 10 of the illustrated embodiment may also optionally include a communication interface 18 that may be any means such as a device or circuitry embodied in either hardware or a combination of hardware and software that is configured to receive and/or transmit data from/to a computing and/or communications device in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

In some environments, the communication interface may alternatively or also support wired communication.

Referring now to FIG. 2, the operations performed, such as by the apparatus 10 of FIG. 1, in order to facilitate the individual identification of audio objects and the selective modification of the audio objects in accordance with an example embodiment are depicted. As shown in block 20 of FIG. 2, the apparatus may include means, such as the processor 12, the user interface 16 or the like, to cause a multimedia file to be presented. The multimedia file includes at least two images, such as a cinemagraph, and audio including one or more audio objects. Prior to the presentation of the multimedia file, the audio objects have been distinguished from one another and the direction, that is, the trajectory, from which each audio object originates has been identified. For example, the metadata associated with the multimedia file may identify each of the respective audio objects and may correspondingly identify the direction from which each of the audio objects originates. An audio signal, such as a signal from a directional microphone, e.g., directly from the microphone, may be separated into audio objects and the direction of an audio object may be determined in various manners including those described, for example, by Makino, Shoji et al., "Blind Source Separation of Convolutive Mixtures of Speech in Frequency Domain", IEICE TRANSACTIONS on Fundamentals of Electronics, Communications and Computer Sciences, Vol. E88-A (July 2005); Mukai, Ryo et al., "Robust real-time blind source separation for moving speakers in a room", ICASSP 20 and/or Lucas Parra et al., "On-line Convolutive Blind Source Separation of Non-Stationary Signals", Journal of VLSI signal processing systems for signal, image and video technology, August 2000, Volume 26, Issue 1-2, pp 39-46.

The images of the multimedia file may be caused to be presented by being caused to be displayed, such as by the user interface 16, e.g., by a display. The images are configured to provide animation associated with respective audio objects and representative of a direction of the respective audio objects. Thus, the animation provided by the images may intuitively indicate to a user the direction of an audio object, such as by indicating the direction from which the audio object originates while the audio object is played or otherwise output by the user interface, e.g., by one or more speakers. The animation may be provided by the images in various manners with some examples described below and illustrated herein.

As shown in FIG. 3A-3C, an animation may be provided by a feature or an area of an image that is configured to change over the course of time when a time sequence of images is viewed. The change in the feature provides the animation in a manner that is indicative of the direction of an associated audio object. In the example depicted in FIGS. 3A-3C, the animation is provided by the direction in which the subject's eyes look with the eyes looking to the left in FIG. 3A, looking to the right in FIG. 3B and looking upwardly in FIG. 3C. As used herein, the direction indicated by an animation is described to be from the perspective of a user of the electronic device, as opposed to from the perspective of the subject of the images. The direction in which the eyes of the subject of FIGS. 3A-3C look may therefore indicate the direction of respective audio objects at different points in time. For example, FIG. 3A may indicate that a first audio object originates from the left, FIG. 3B may indicate that a second audio object originates from the right and FIG. 3C may indicate that a third audio object originates from above. While the images that provide the animation may be displayed independent of the audio objects, e.g., the image of FIG. 3A may be displayed without concurrently outputting the first audio object, the apparatus 10, such as the processor 12, the user interface 16 of the like, of an example embodiment may cause the images that provide the animation to be displayed in synchronization with the respective audio objects. Thus, in this example embodiment, the image of FIG. 3A may be displayed during a first time period while concurrently outputting the first audio object, the image of FIG. 3B may be displayed during a second time period while concurrently outputting the second audio object and the image of FIG. 3C may be displayed during a third time period while concurrently outputting the third audio object.

While the eyes of the subject of a sequence of images may serve as the animation indicative of the direction of respective audio objects, other features of an individual or other subject of a sequence of images may serve as the animation in other example embodiments. For example, a plurality of images of a dog may provide the animation with the direction in which the dog is facing in the different images being indicative of the direction of a respective audio object. Alternatively, an individual who is the subject of a sequence of images may be wearing a hat and the direction in which the bill of the hat is pointing may serve as the animation indicative of the direction of respective audio objects.

The images that include the animation may be captured or otherwise created in a variety of manners. For example, a plurality of images may be captured and a subset of the images may be selected that include a particular feature that points toward, is moved in or is otherwise indicative of different directions, that is, the different directions from which the audio objects originate. In an instance in which the images that are captured do not include movement of the particular feature in a desired direction, such as a direction in which an audio object originates, an additional image may be created, such as an additional image that is based upon an image that is captured, in which the feature is indicative of the desired direction. For example, an additional image may be created that is the reverse of an image that was captured so as to depict a feature that moves in the opposite direction from that in which the feature moves in the images that were captured.

While the one or more images may include an animation that is provided by the movement of one or more features of the subject of the images, the one or more images may include other types of animation. As shown in FIGS. 4A-4D, the apparatus 10, such as the processor 12, the user interface 16 or the like, may cause an artificial element 30 to be added or introduced to the images with the artificial element being associated with a respective audio object and being representative of the direction of the audio object. As shown in FIG. 4A, the horn that is positioned to the right side of the bird, that is, the subject of the image, may be associated with an audio object that originates to the right. Conversely, FIGS. 4B, 4C and 4D depict images in which the horn has been positioned to the left, below and above the bird, respectively, so as to be associated with respective audio objects that originate from the left, below and above, respectively. Thus, regardless of the type of animation that is provided by the one or more images of the multimedia file, the animation is associated with respective audio objects and representative of the direction of the respective audio objects.

The apparatus 10, such as the processor 12, the user interface 16 or the like, may be configured to cause various types of artificial elements to be added to an image and to associate the artificial elements with the direction of a respective audio object in various manners. For example, the apparatus, such as the processor, may be configured to determine the source of an audio object or the genre of the audio object, such as from a review of metadata associated with the multimedia file. Examples of sources of the audio object may include various musical instruments or various tools and examples of genres of the audio object may include latin music or classical music. As such, the apparatus, such as the processor, the user interface or the like, may be configured to add an artificial element that visually represents the source of the audio object, such as an icon representative of a musical instrument or a tool, or the genre of the audio object, such as an icon associated with the respective genre. In regards to the representation of the direction of the audio object, the apparatus, such as the processor, the user interface or the like, may cause the artificial element to be positioned relative to the subject of the image so as to indicate the direction of the audio object as described above in conjunction with FIGS. 4A-4D. Alternatively, the apparatus, such as the processor, the user interface or the like, may be configured to represent the direction of the audio object in other manners, such as by causing the artificial element to slide into the image from the direction of the audio object.

As shown in block 22 of FIG. 2, the apparatus 10 of an example embodiment also includes means, such as the processor 12, the user interface 16 or the like, for receiving user input in relation to an animation associated with an audio object or the direction of the audio object represented by an animation. User input may be provided in a variety of different manners. As shown in FIG. 5, for example, a user input may be provided in a form of a gesture or a touch input, such as a swipe, that is recognized by the apparatus, such as the processor, the user interface or the like. By way of example, a user input 32 in the form of an upward swipe across a touchscreen display may be provided as shown in FIG. 5 concurrent with the display of the image that includes an animation that is associated with an audio object that originates from an upward direction, thereby selecting the audio object from above. Alternatively, the user input may have been directed to the right in conjunction with the animation depicted in FIG. 3B in order to select the audio object that appears to originate from the right or the user input could have been directed to the left while the animation of FIG. 3A is presented in order to select the audio object that appears to originate from the left.

While the user input may be provided concurrent with the display of the image in which the animation is associated with an audio object that originates from the same direction as that indicated by the user input, the apparatus 10, such as the processor 12, the user interface 16 or the like, of other example embodiments may be configured to receive and interpret user input that is associated with a direction, such as a swipe or gesture that extends in a direction, to select an audio object that originates in the same direction regardless of the image that is concurrently being displayed. Thus, the apparatus, such as the processor, the user interface or the like, may be configured to recognize the selection of an audio object that originates from the same direction as that indicated by the user input even if the image that is presented at the time of the user input is associated with an audio object that originates from a different direction. In these other example embodiments, the animation may therefore serve an informational purpose to alert the user of the different audio objects and their respective directions even though the user input need not be synchronized with the corresponding image that is associated with an audio object that originates from the same direction as that indicated by the user input.

The apparatus 10, such as the processor 12, the user interface 16 or the like, may be responsive to other types of user input that may be provided in relation to an animation in order to select the audio object associated with the animation. In regards to an embodiment in which the animation is provided by an artificial element, the user input may select the artificial element, such as by touching the artificial object depicted in one of the images. In another example embodiment, the user input may be provided in the form sound or audible commands. For example, the apparatus, such as the processor, the user interface or the like, may be configured to interpret the direction from which a user snaps their fingers to be indicative to the direction of the audio object that is to be selected and/or may interpret the volume of the sound generated by the user snapping their fingers to be indicative of the manner in which the selected audio object is to be modified, as described below.

Based upon the user input, the apparatus 10, such as the processor 12, the user interface 16 or the like, may be configured to modify the audio object that was selected or a parameter associated with the selected audio object. The apparatus, such as the processor, the user interface or the like, may be configured to modify the audio object in various manners, such as by controlling the replay of the audio object which may, in turn, include altering the volume of the audio object, muting the audio object, highlighting the selected audio object by muting all other audio objects or the like. For example, the replay of a respective audio object may be controlled by emphasizing the respective audio object relative to other audio object, such as by increasing the volume of the respective audio object, decreasing the volume of the other audio objects, muting the other audio objects or the like. As another example, the replay of a respective audio object may be controlled by deemphasizing the respective audio object relative to other audio object, such as by decreasing the volume of the respective audio object, increasing the volume of the other audio objects, muting the respective audio object or the like. By way of further example, a user input, such as shown in FIG. 5, that is indicative of a first, e.g., upward, direction and is provided in relation to an animation associated with a respective audio object may cause the respective audio object to be emphasized, such as by causing the other audio objects that do not originate in the first direction to be muted such that only the selected audio object that originates in the first direction may be output. Alternatively, as shown in FIG. 6, the user input may extend in a first direction, such as in an in upward direction, but may continue beyond the touch screen. In this example embodiment, the user input may be interpreted by the apparatus, such as the processor, the user interface or the like, as an instruction to deemphasize, e.g., mute, the audio object that originates from the first direction, such as an audio object that primarily constitutes noise, such that a replay of the multimedia file will include the other audio objects that originate from other directions, but not the audio object that originated from the first direction. In embodiments such as depicted in FIGS. 5 and 6 in which the volume of one or more audio objects are muted or otherwise reduced, the apparatus, such as the processor, the user interface or the like, may be responsive to subsequent user input to further modify the manner in which the volume of an audio object that has been muted or otherwise reduced is thereafter output. For example, the further user inputs may cause an audio object that was previously muted to thereafter be un-muted. The further user inputs may be of the same type as the prior user inputs or the further user inputs may be of a different type depending upon the embodiment.

In another example embodiment, the apparatus 10, such as the processor 12, the user interface 16 or the like, may be configured to be responsive to user input in a first direction, such as an upward direction, so as to modify the volume of the audio object that originates from the first direction. In this regard, in response to the user input in the first direction, the apparatus, such as the processor, the user interface or the like, may be configured to permit the user to modify the volume of the audio object that originates in the first direction. As shown in FIG. 7, for example, in response to a user input that extends in an upwardly direction, the apparatus, such as the processor, the user interface of the like, may cause a volume slider 36 to be presented upon the display. The user is thereafter permitted to provide input to modify the slider in order to correspondingly set the volume of the audio object that originates from the upward direction. For example, FIG. 7 depicts an upwardly directed user input 38 that causes the volume of the selected audio object to be increased. FIG. 4D provides another example in which the volume of the audio object that originates from an upward direction is modified following user input that selects the animation in the form of an artificial element 30 associated with the audio object that originates from an upward direction.

The apparatus 10, such as the processor 12, the user interface 16 or the like, may be configured to modify the audio object associated with the animation and selected by the user input in a wide variety of manners in addition to those described above. Regardless of the manner in which an audio object is modified, the apparatus may also include means, such as the processor, the user interface or the like, for causing replay of the audio object for which user input was received to be modified, such as by causing the selected audio object to be muted, to be replayed with a user-selected volume or the like. See block 24 of FIG. 2. In addition to permitting replay of the audio objects, as modified, the apparatus, such as the processor, the user interface of the like, may be configured to cause all or some of the images that include the animation to be displayed concurrent with the output of the audio objects. In an embodiment in which one or more audio object have been muted, the apparatus, such as the processor, the user interface or the like, may be configured to cause the image(s) associated with the audio object(s) that have been muted to no longer be displayed, at least not until the audio object(s) have been un-muted. However, the other images that are associated with audio objects that have not been muted may continue to be displayed.

As illustrated in the embodiment of FIGS. 3A-3C, the images may include a single animated feature that sequentially identifies different audio objects from different directions. Alternatively, the images that include the animation may include a plurality of individually selectable animations associated with different respective audio objects. For example, a single image may include a plurality of individually selectable animations, each associated with a different respective audio object. As such, a user may select any one of the animations and accordingly modify the properties of the audio object associated with the respective animation, such as by tapping or pinching a respective animation with a pinch out causing a property, e.g., volume, of the respective audio object to be increased and a pinch in causing the property, e.g., volume, of the respective audio object to be decreased. The animations may be visually represented in different manners and the directions of the audio objects associated with each animation may be represented in different manners. For example, an image may include a plurality of different areas each of which has an associated animation that may be visually apparent to the user, such as by blinking, being presented in a different color or the like. Additionally, each animation of this example embodiment may be visually represented in a manner that indicates the direction of the audio object associated therewith. For example, the animation may be positioned about the periphery of the image at a location that coincides with the direction of the audio object with which the animation is associated. In this regard, an animation located along an upper border of an image may be associated with an audio object having a direction that originates from above.

In an example embodiment, the apparatus 10 may include means, such as the processor 12 or the like, for dividing a video into a plurality of sections. Each section may include a plurality of images, such as a cinemagraph, including one or more animations associated with respective audio objects and representative of a direction of the respective audio objects. As shown in FIG. 8A, a video of a girl hula hooping has been captured. In this example embodiment, user input may be provided, such as by selecting button 40 upon the touchscreen, to enter an edit mode. As shown in FIG. 8B, the apparatus, such as the processor, may be configured to divide the video into sections and to select a plurality of images from each section that may be presented in a time sequence in FIG. 8B. In this regard, the apparatus, such as the processor, may be configured to select the plurality of images of a respective section so as include an animation that identifies the different audio objects and the directions from which those audio objects originate. With respect to the example of FIG. 8B, the direction in which the subject faces is indicative of a respective audio object with the audio object originating from the direction in which the subject faces. In an instance in which the selected images are designated from the left to the right as first, second, third and fourth images, the first, second and fourth images are each associated with an audio object that originates from the left, while the third image is associated with a different audio object that originates from the right. While the section of video may have included images in which the subject faced both to the left and to the right, the plurality of images of the section may have only included images of the subject facing in one direction, such as to the left, in some embodiments. Since the section of this example includes two audio objects, one that originates from the left and one that originates from the right, the apparatus, such as the processor, may be configured to reverse one of the images such that the subject now faces to the right in order to correspondingly represent the audio object that originates from the right. By selecting one of the images of a section of the video, the user may modify the properties of the audio object associated with the respective image, such as in the manner described above, at least during the respective section of the video.

As described above, one or more images may include an animation that identifies one or more different audio objects and that also indicates the direction from which the one or more audio objects originate. In the foregoing example embodiments, a user may select a respective audio object by interacting with an image that includes an animation and may then modify one or more properties of the respective audio object. In addition to or instead of permitting modification of one or more properties of audio objects, one or more images may be presented in a manner that facilitates the identification of the different audio objects and the direction from which the audio objects originate in a manner that is intuitive and, in some embodiments, entertaining to a user, thereby improving the user experience.

In this example embodiment, the apparatus 10 may include means, such as the processor 12, the user interface 16 or the like, configured to cause at least two images to be presented. See block 50 of FIG. 9. In this regard, a single image may be presented that changes over time or a plurality of images, such as a gallery, may be concurrently presented. In this example embodiment, the apparatus may also include means, such as the processor, the user interface or the like, configured to receive audio signals while the one or more images are presented. See block 52. For example, the user interface may include one or more microphones so as to capture audio signals in proximity to the electronic device that embodies the apparatus. The apparatus may also include means, such as the processor or the like, configured to determine the direction of the audio object represented by the audio signals. See block 54 of FIG. 9. The direction of the audio object may be identified in various manners including, for example, by Makino, Shoji et al., "Blind Source Separation of Convolutive Mixtures of Speech in Frequency Domain", IEICE TRANSACTIONS on Fundamentals of Electronics, Communications and Computer Sciences, Vol. E88-A (July 2005); Mukai, Ryo et al., "Robust real-time blind source separation for moving speakers in a room", ICASSP 20 and/or Lucas Parra et al., "On-line Convolutive Blind Source Separation of Non-Stationary Signals", Journal of VLSI signal processing systems for signal, image and video technology, August 2000, Volume 26, Issue 1-2, pp 39-46.

As shown in block 58 of FIG. 9, the apparatus 10 of this example embodiment may also include means, such as the processor 12, the user interface 16 or the like, configured to provide for visual animation representative of the direction of the audio object. By way of example, FIG. 10A depicts an embodiment in which the subject is looking forward. In response to the detection of an audio object that originates to the left, such as represented by the audio source 60 of FIG. 10B, the image may be replaced by a subsequent image of the subject that is looking to the left, that is, toward the source of the audio object as shown in FIG. 10B. As such, the eyes of the subject of this example embodiment provide the visual animation representative of the direction of the audio object that was detected. Similarly, an audio object that is detected to have originated from the right or from above may have, in turn, caused a subsequent image to be presented in which the eyes of the subject look to the right or upwardly, respectively, so as to indicate the direction of the respective audio objects. Although an animation provided by movement of a feature, e.g., the eyes, of the subject of a plurality of images is illustrated in FIGS. 10A and 10B and described above, the animation may, instead, be an artificial element that is introduced into the image in a position that corresponds to and is indicative of the direction of the audio object that was detected.

While the embodiment of FIGS. 10A and 10B depicts a transition that jumps from an image of the subject looking forward to an image of this subject looking to the left in response to the detection of an audio object from the left, the transition in response to the detection of an audio object may be smoother in other example embodiments in which the apparatus 10, such as the processor 12, the user interface 16 or the like, causes a plurality of sequential images to be presented that gradually transition from the original image, that is, the image presented at the time that the audio object is detected, to the image of the subject in which the animation indicates the direction of the detected audio object. In this regard, FIGS. 11A-11H illustrate a sequence of images that may be presented in response to the detection of an audio object to the left in which the eyes of the subject of the images gradually move from looking to the right to looking forward and eventually looking to the left in the direction of the audio object that was detected.

In an example embodiment, the transition of the images including the animation may be synchronized with a beat, such as the beat of the audio object, e.g., the beat of music in an instance in which the audio object includes music. As such, the apparatus 10 of this example embodiment may include means, such as the processor 12 or the like, configured to determine a beat associated with the audio object. See block 56 of FIG. 9. As such, the apparatus, such as the processor, the user interface or the like, of this example embodiment may be configured to provide for the visual animation representative of the direction of the audio object in a manner in which the visual animation, such as the transition from one image to another image that includes the animation, is presented in synchronization with the beat of the audio object. By way of example, FIG. 12A depicts an initial image of a subject who is looking to the right. In response to the detection of an audio object from the left, the apparatus, such as the processor, the user interface or the like, may cause the visual animation, that is, the eyes of the subject, to transition to an intermediate position, such as by presentation of a subsequent image in which the eyes look forward as shown in FIG. 12B, in synchronization with the first beat of the audio object. The apparatus, such as the processor, the user interface or the like, of this example embodiment may then cause the visual animation to transition to a final position, such as by presentation of a final image in which the eyes look to the left in the direction of the audio object, in synchronization with the second beat of the audio object.

In an example embodiment, the image may then remain in the position shown in FIG. 12C in which the animation continues to point toward the direction of the audio object, that is, the eyes remain looking in the direction of the audio object. Alternatively, the apparatus 10, such as the processor 12, the user interface 16 or the like, may be configured to repeat the movement represented by the visual animation so as to repeatedly demonstrate or reinforce the direction of the audio object that was detected. As shown in FIG. 13A-13G, the detection of an audio object from the left may cause the visual animation to transition from an initial image in which the eyes of the subject look to the right to an intermediate position in which the eyes of the subject look forward in synchronization with the first beat of the audio object and then to a direction in which the eyes look to the left in the direction of the audio object in synchronization with the second beat. In this example embodiment, the apparatus, such as the processor, the user interface or the like, may repeatedly loop the images, such as by alternating between the intermediate and final images, in which the visual animation is repeatedly directed toward the direction in which the audio image was detected so as to remind the user of the direction from which the audio object was detected.

Figure 14A:
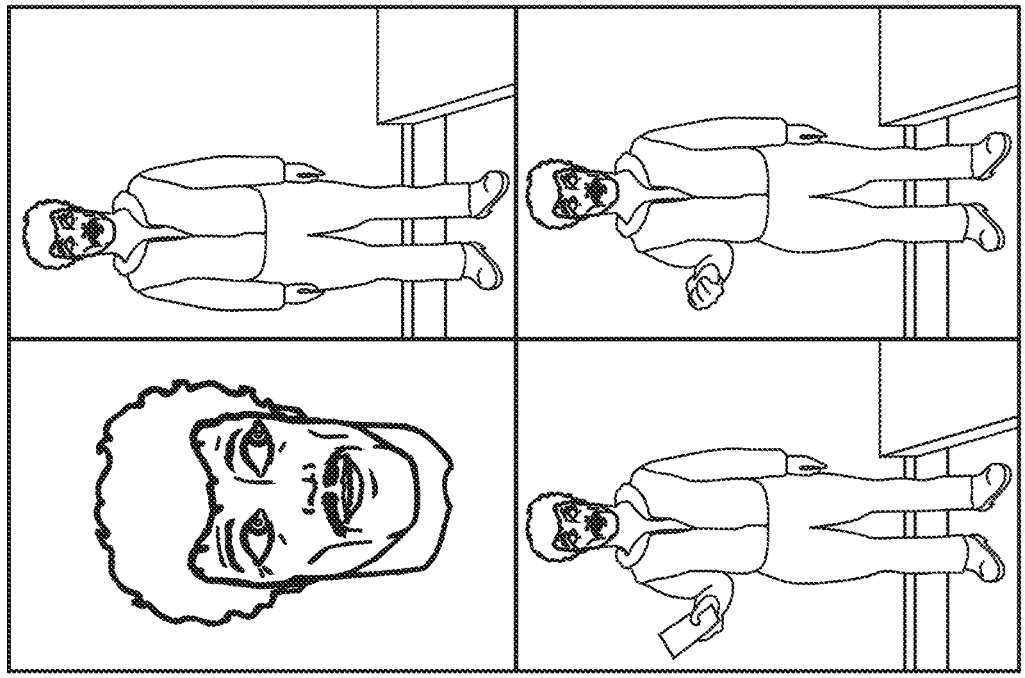
Figure 14B:
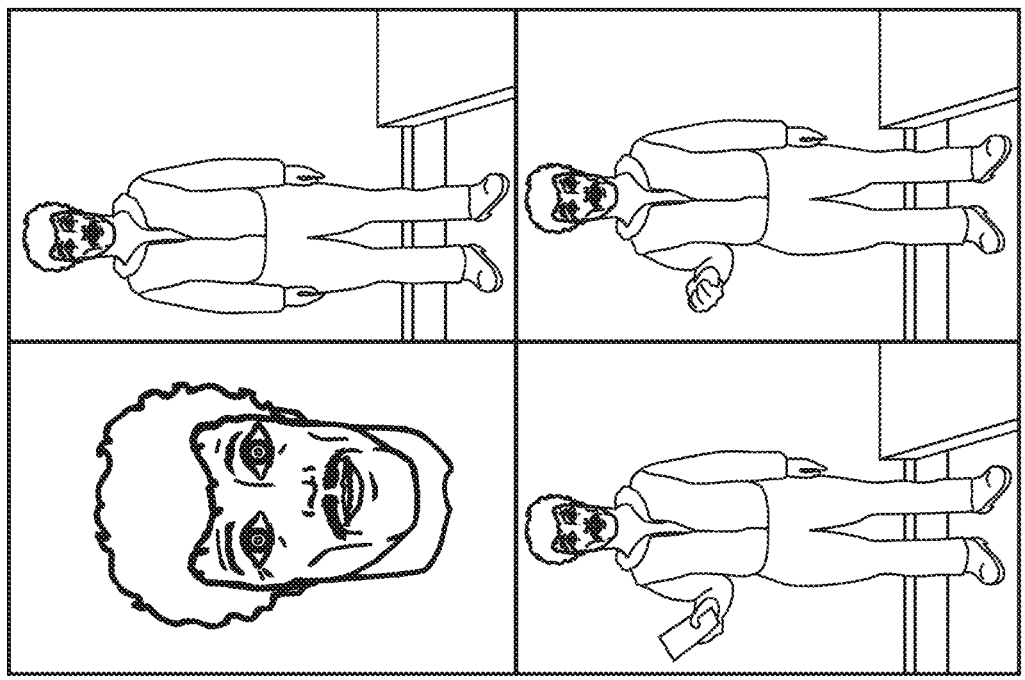
Figure 14D:
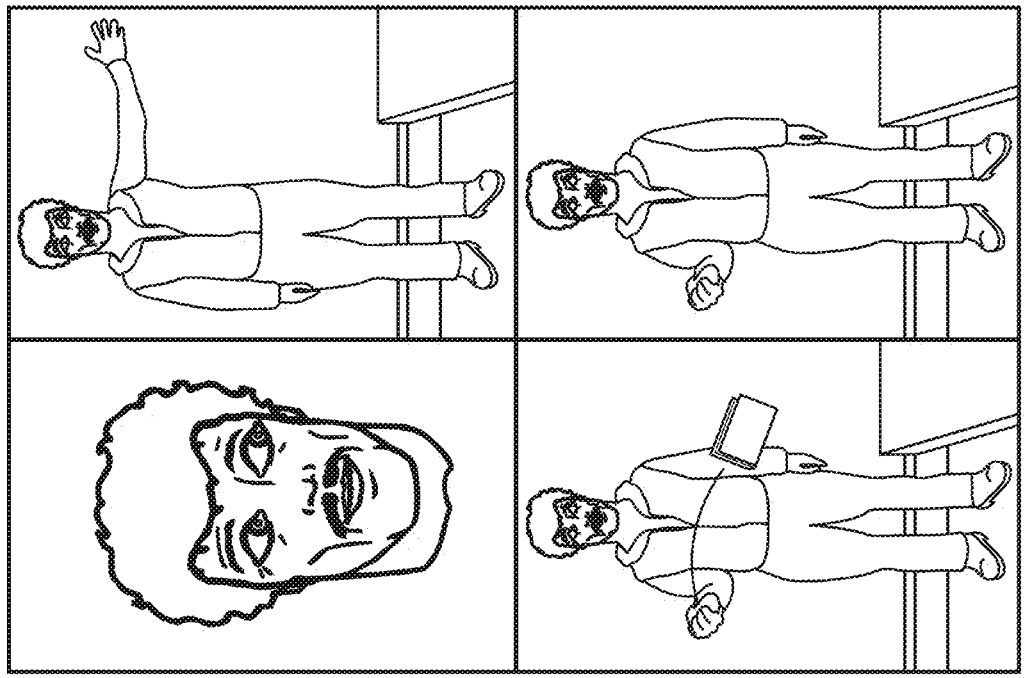
Figure 14C:
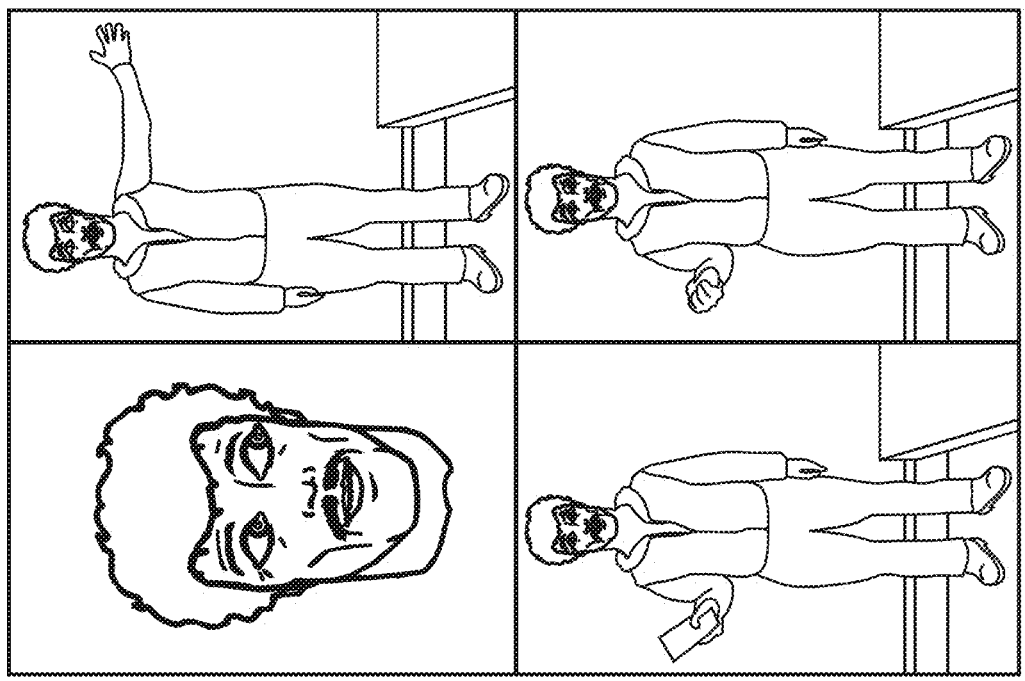
Figure 14E:
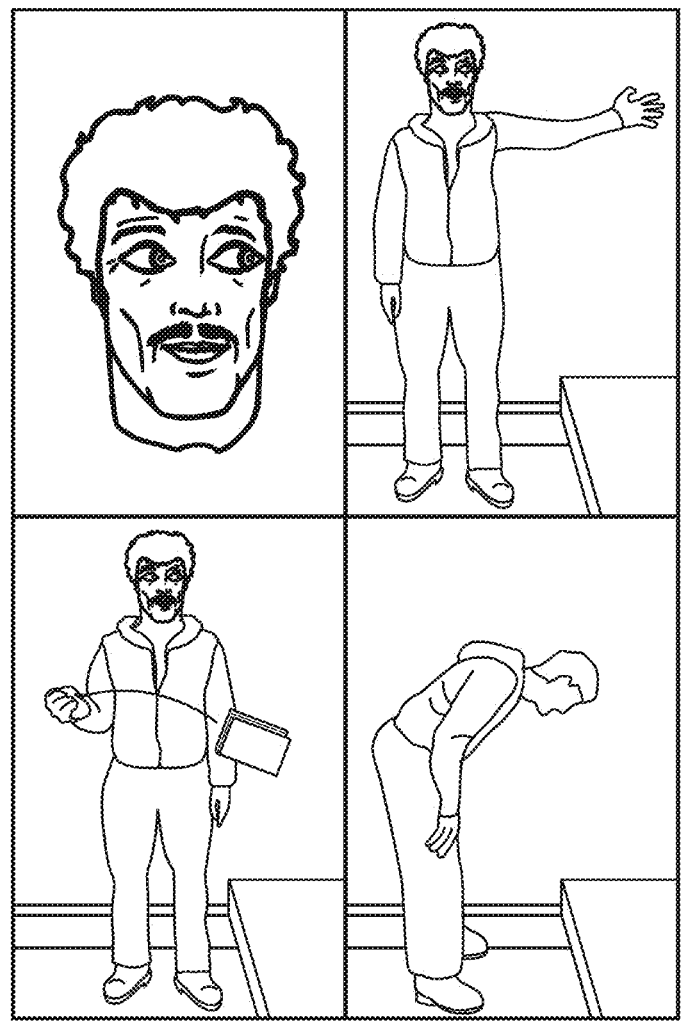

While the same type of image has been illustrated above in order to provide the visual animation indicative of a respective audio object and the direction associated with the respective audio object, different types of images may be utilized in sequence to indicate a respective audio object and the direction associated with the respective audio object. As shown in FIG. 14A, the apparatus 10 of this example embodiment, such as the processor 12, the user interface 16 or the like, may be configured to cause an initial gallery of images to be presented. In response to the detection of an audio object to the right and in synchronization with the first beat of the audio object, one of the images of the gallery may be modified so as to animate the direction in which the audio object was detected. In the example embodiment of FIG. 14B, the image in the upper left quadrant has been modified to provide the animation such that the eyes of the subject now look to the right to indicate the direction of the audio object that was detected. In synchronization with the second beat, another one of the images of the gallery may be modified to animate the direction in which the audio object was detected. For example, FIG. 14C illustrates the upper right image being modified such that the left hand of the subject now points to the right in the direction of the audio object that was detected. Similarly, in synchronization with the third and fourth beats, other ones of the images of the gallery may be modified to further animate the direction in which the audio object was detected. For example, FIG. 14D illustrates the lower left image being modified in synchronization with the third beat such that an object previously held by the subject is tossed to the right in the direction of the audio object that was detected. Further, FIG. 14E illustrates the lower right image being modified in synchronization with the fourth beat such that the subject bends to the right in the direction of the audio object that was detected.

In another example embodiment, the apparatus 10, such as the processor 12, the user interface 16 or the like, may be configured to cause a plurality of images to be presented. Based upon a parameter, such as volume, associated with the audio object that is detected, the apparatus, such as the processor, may be configured to determine one or more of the plurality of images to be replaced with respective subsequent image(s). For example, the apparatus, such as the processor, of this example embodiment may be configured to determine that less than all of the images that were presented at the time that the audio object was detected are replaced with respective subsequent image(s) such that one or more of the images that were presented at the time that the audio object was detected remain following the visual animation. The apparatus, such as the processor, of this example embodiment may also be configured to provide for the visual animation by causing one or more subsequent images to be presented in a manner that is based on the direction of the audio object and that represents movement in the direction of the audio object relative to the previously displayed image(s) that have been replaced by the subsequent images.

By way of example, a plurality of images, e.g., a gallery, may be presented. In response to the detection of an audio object, the apparatus 10, such as the processor 12, may be configured to determine the direction of the audio object as well as another parameter, e.g., volume, of the audio object. The apparatus, such as the processor, may determine the number of images to be replaced by subsequent images based upon the parameter of the audio object. In an embodiment in which the parameter of the audio object is the volume of the audio object, the number or percent of the images that are replaced by subsequent images may be proportional to the volume. As such, a greater percent, up to and including all, of the images may be replaced by subsequent images in response to louder audio objects and a smaller percent of the images may be replaced by subsequent images in response to quieter audio objects. In an instance in which some, but not all, of the images are to be replaced, the apparatus, such as the processor, may be configured to identify the images that are positioned in the direction of the audio object to be replaced by subsequent images. For example, in response to an audio object having a low volume that originates from the left, the apparatus, such as the processor, may identify a minority of the images including those images that are positioned to the left to be replaced with subsequent images while the majority of the images including those positioned to the right (opposite the direction of the audio object) remain.

The subsequent images may include images in which the animation is associated with the direction from which the audio object originates, such as images in which the eyes of the subject look to the left in the foregoing example. Thus, the resulting gallery of images may not only discriminate between audio objects, but may provide information regarding the direction of the audio object and another parameter, e.g., volume, of the audio object based upon the number or percent of the images that are replaced with the animated subsequent images. In instances in which the parameter of the audio object subsequently changes, such as by increasing or decreasing in volume, the number of images replaced by animated subsequent images may be correspondingly changed, such as by being increased or decreased, respectively, so as to inform the user of the change in the audio object. The apparatus 10, such as the processor 12, the user interface 16 or the like, may be configured to cause the plurality of images to react to a single audio object at any one time, such as the most recently detected audio object, the loudest audio object, the audio object that originates from a predefined direction or the like. However, the apparatus, such as the processor, the user interface or the like, of another example embodiment may be configured to concurrently cause different ones of the images to be modified in response to the detection of different audio objects.

In some example embodiments in which a plurality of images are displayed, the images may be associated with different audio objects. In this embodiment, the apparatus 10, such as the processor 12, the user interface 16 or the like, may be configured to cause only those images that are associated with the audio object that is detected to react to the audio object, such as by being replaced by a subsequent image that includes an animation that depicts movement in the same direction from which the audio object originates. Thus, a user may quickly and intuitively determine which ones of the images are associated with the different audio objects by reviewing the manner in which the audio objects are transformed in response to the detection of the different audio objects.

As described above, a method, apparatus 10 and computer program product are provided in accordance with an example embodiment in order to facilitate the discrimination between and the identification of one or more audio objects and the directions from which the audio objects originate. The method, apparatus and computer program product of an example embodiment also permit user interaction with, such as modification of, respective audio objects in an intuitive manner, such as through the use of an animation. As such, users may more readily interact with individual audio objects in accordance with a method, apparatus and computer program product of an example embodiment so as to create a desired audio track, thereby potentially improving the resulting user experience.

As described above, FIGS. 2 and 9 illustrate flowcharts of an apparatus 10, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, while described above in regards to the representation and modification of audio objects, the method, apparatus 10 and computer program product of an example embodiment may correspondingly provide one or more images that include an animation to identify different visual objects and to permit modification of one or more parameters of the visual objects in a corresponding manner to that described above in conjunction with audio objects. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   causing a multimedia file to be presented that comprises at least two images and audio comprising a plurality of audio objects, wherein the at least two images comprise a time sequence of images and are configured to provide animation that is associated with a respective audio object and that provides a visual indication of a direction from which the respective audio object originates, and wherein the at least two images comprise a change in a feature or an area of the at least two images during animation thereby providing the visual indication of the direction from which the respective audio object originates;
   receiving user input in relation to the animation associated with the respective audio object or the direction of the respective audio object represented by the animation; and
   with a processor, causing replay of the respective audio object, for which user input was received, as modified based on the user input.

2. A method according to claim 1 wherein receiving user input comprises receiving user input indicative of a first direction, and wherein causing replay of the respective audio object comprises controlling the replay of the audio objects such that the respective audio object having the direction that extends in the first direction is emphasized relative to audio objects having other directions.

3. A method according to claim 1 wherein receiving user input comprises receiving user input indicative of a first direction, and wherein causing replay of the respective audio object comprises controlling the replay of the audio objects such that the respective audio object having the direction that extends in the first direction is deemphasized relative to audio objects having a direction different than the first direction.

4. A method according to claim 1 wherein receiving user input comprises receiving user input indicative of a first direction, and wherein the method further comprising receiving user input modifying a volume of the respective audio object having the direction that extends in the first direction.

5. A method according to claim 1 wherein at least two images comprise a plurality of individually selectable animations associated with different respective audio objects.

6. A method according to claim 1 further comprising dividing a video into a plurality of sections, each section comprising a plurality of images including one or more animations associated with respective audio objects and representative of a direction of the respective audio objects.

7. A computer program product comprising at least one non-transitory computer-readable storage medium having computer-executable program code instructions stored therein, the computer-executable program code instructions comprising program code instructions to, when executed by the processor, cause performance of the method of claim 1.

8. An apparatus comprising at least one processor and at least one memory including computer program code, the at least one memory and the computer program code configured to, with the processor, cause the apparatus to at least:
   cause a multimedia file to be presented that comprises at least two images and audio comprising a plurality of audio objects, wherein the at least two images comprise a time sequence of images and are configured to provide animation that is associated with a respective audio object and that provides a visual indication of a direction from which the respective audio object originates, and wherein the at least two images comprise a change in a feature or an area of the at least two images during animation thereby providing the visual indication of the direction from which the respective audio object originates;

receive user input in relation to the animation associated with the respective audio object or the direction of the respective audio object represented by the animation; and cause replay of the respective audio object for which user input was received, as modified based on the user input.

9. An apparatus according to claim 8 wherein the at least one memory and the computer program code are configured to, with the processor, cause the apparatus to receive user input by receiving user input indicative of a first direction and to cause replay of the respective audio object by controlling the replay of the audio objects such that the respective audio object having the direction that extends in the first direction is emphasized relative to audio objects having other directions.

10. An apparatus according to claim 8 wherein the at least one memory and the computer program code are configured to, with the processor, cause the apparatus to receive user input by receiving user input indicative of a first direction and to cause replay of the respective audio object by controlling the replay of the audio objects such that the respective audio object having the direction that extends in the first direction is deemphasized relative to audio objects having a direction different than the first direction.

11. An apparatus according to claim 8 wherein the at least one memory and the computer program code are configured to, with the processor, cause the apparatus to receive user input by receiving user input indicative of a first direction, and wherein the at least one memory and the computer program code are further configured to, with the processor, cause the apparatus to receive user input modifying a volume of the respective audio object having the direction that extends in the first direction.

12. An apparatus according to claim 8 wherein at least one image comprises a plurality of individually selectable animations associated with different respective audio objects.

13. An apparatus according to claim 8 wherein the at least one memory and the computer program code are further configured to, with the processor, cause the apparatus to divide a video into a plurality of sections, each section comprising a plurality of images including one or more animations associated with respective audio objects and representative of a direction of the respective audio objects.

14. A method comprising:
causing at least two images to be presented;
receiving audio signals;
determining a direction from which an audio object originates from the audio signals; and
with a processor, providing for visual animation representative of the direction from which the audio object originates by causing one or more subsequent images to be presented that represent movement that provides a visual indication in the direction of the audio object relative to the at least two images that were previously presented, wherein the one or more subsequent images, in combination with the at least two images that were previously presented, comprise a time sequence of images, and wherein the time sequence of images comprises a change in a feature or an area during the visual animation thereby providing the visual indication of the direction from which the audio object originates.

15. A method according to claim 14 further comprising determining a beat associated with the audio object, wherein providing for visual animation comprising providing for visual animation representative of the direction of the audio object in synchronization with the beat.

16. A method according to claim 14 wherein causing at least two images to be presented comprises causing a plurality of images to be presented, and wherein the method further comprises determining one or more of the plurality of images to be replaced with the one or more subsequent images based upon a parameter associated with the audio object.

17. A method according to claim 16 wherein determining one or more of the plurality of images to be replaced with the one or more subsequent images comprises determining less than all of the images to be replaced with the one or more subsequent images such that one or more of the images remain following the visual animation, and wherein providing for the visual animation comprises causing the one or more subsequent images to be presented in a manner that is based on the direction of the audio object and that represents movement in the direction of the audio object relative to the one or more of the plurality of images that are determined to be replaced.

18. A computer program product comprising at least one non-transitory computer-readable storage medium having computer-executable program code instructions stored therein, the computer-executable program code instructions comprising program code instructions to, when executed by the processor, cause performance of the method of claim 14.

* * * * *